United States Patent [19]

Matsumoto

[11] Patent Number: 5,043,922
[45] Date of Patent: Aug. 27, 1991

[54] GRAPHICS SYSTEM SHADOW GENERATION USING A DEPTH BUFFER

[75] Inventor: Takashi Matsumoto, Tokyo, Japan

[73] Assignee: International Business Machines Corporation, Armonk, N.Y.

[21] Appl. No.: 404,238

[22] Filed: Sep. 7, 1989

[30] Foreign Application Priority Data

Sep. 9, 1988 [JP] Japan .................................. 63-224448

[51] Int. Cl.⁵ .............................................. G06F 15/72
[52] U.S. Cl. ................................................. 364/522
[58] Field of Search ........................ 364/522; 340/729

[56] References Cited

U.S. PATENT DOCUMENTS 4,625,289  11/1986  Rockwood ........................... 364/522
4,737,921  4/1988  Goldwasser et al. ............ 364/522 X

*Primary Examiner*—Gary V. Harkcom
*Assistant Examiner*—Mark K. Zimmerman
*Attorney, Agent, or Firm*—Mark S. Walker

[57] ABSTRACT

A shadow generation method and apparatus that employs a depth buffer technique to increase the speed of calculation of visible shadows. The system employs pipelined processors to determine visible objects and shadows generated by those objects for one or more light sources. The technique determines whether a shadow exists at a given pixel by evaluating the parity of the number of intersections between shadow polygons and a line of sight extending from the viewpoint. Pipeline processing is introduced to speed the process to result in rapid evaluation of a large number of objects and associated shadows. An alternate embodiment is presented which retains many of the speed advantages but allows the use of processors other than pipelined processors. Determination of the effect of a shadow on a given point is further speeded by indexing the shadow affect resulting in a quantized shadow correction value that reduces the processing requirements.

10 Claims, 18 Drawing Sheets

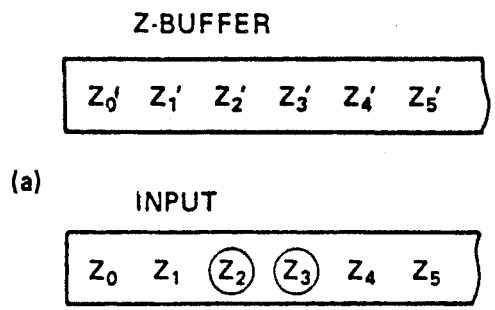
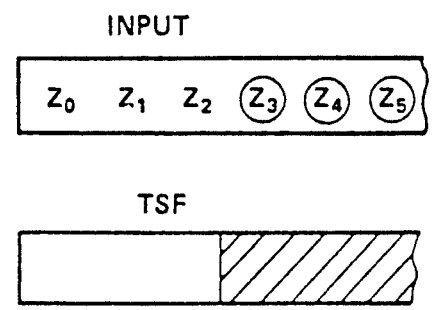
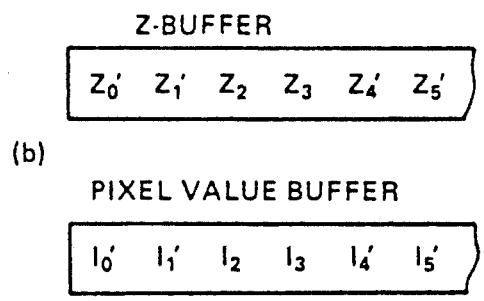
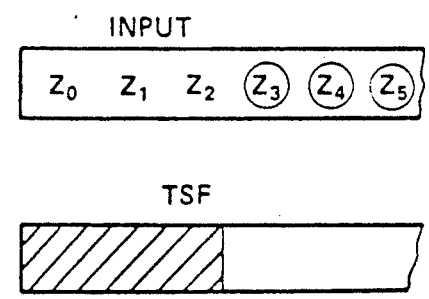
FIG. 9
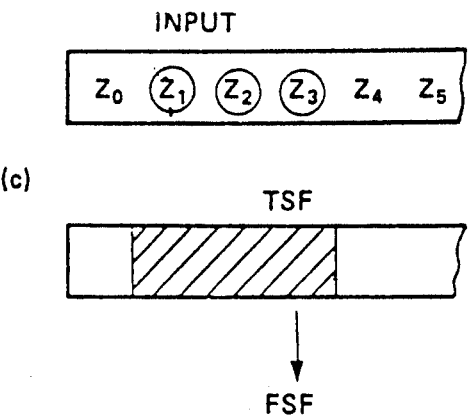
FIG. 10

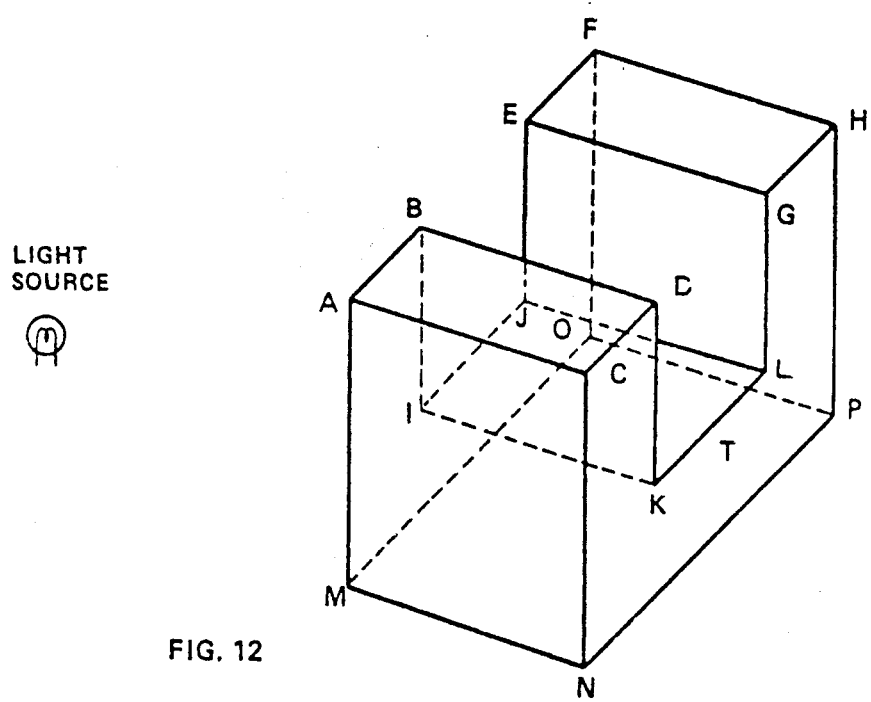
FIG. 12
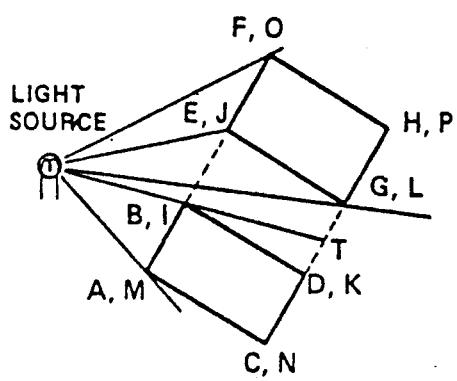
FIG.13 (a) TOP VIEW
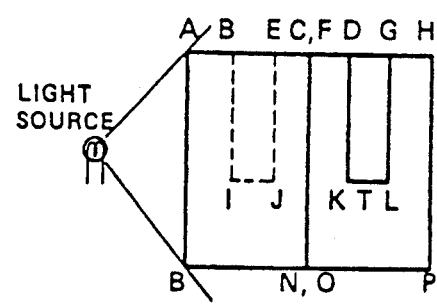
FIG.13 (b) FRONT VIEW

GRAPHICS SYSTEM SHADOW GENERATION USING A DEPTH BUFFER

BACKGROUND OF THE INVENTION

A. Field of the Invention

This invention relates to a graphics system for three-dimensional graphic representation, which can quickly draw a shadow of an object by utilizing hidden-surface hardware implementing Z-buffer processing including, e.g. scan line Z-buffer processing, to enable the presence or absence of a shadow to be determined with a simple system arrangement.

B. Prior Art

Conventional shadow generation techniques are divided into the three techniques of shadow mapping, ray tracing and shadow polygon determination. The shadow polygon technique that will be described more fully later is a variation of the hidden-surface elimination process, and differs from the other two techniques in the fact that it can be incorporated in hardware and its processing speed can be improved by using the scan line process or the Z-buffer process. The present invention is directed to an improvement on the prior art shadow polygon process.

The original prior art shadow polygon process is described first, and then a prior art algorithm by Brotman and Badler that allows use of the shadow polygon process in combination with the Z-buffer process is described.

(1) Original process

The process of shadow polygon determination uses an imaginary object (region) called a shadow volume for generating shadows. A shadow volume is a shadow space generated by a light source and an object (a space inside of which becomes a shadow of the object) (FIG. 23). In a case where all objects are represented by polygons, as is conventionally done in high speed drawing, the shadow volume is represented by a practically infinite size polyhedron, and all of its sides are also represented by polygons (in practically infinite size). Each side is called a shadow polygon. Shadow polygon determination processing is to find the visible portion of a shadow by removing hidden-surfaces of other shadow polygons and objects.

Two objects, A and B are studied under a point of view and a light source as in FIG. 24B. The shadow is generated as shown in FIG. 24A. The object A generates a shadow volume surrounded by the shadow polygons S1 and S2, and polygons A0A1 and A1A2. Where the line of sight intersects with the shadow polygon, the line of sight is said to enter or exit from the shadow volume. Shadow generation can be performed by sequentially inspecting the shadow polygons within each pixel until the line of sight reaches an object's surface, using a process such as the scan line process (a kind of hidden-surface removal).

When the polygons in the direction of the point a in FIG. 24B are studied, because the first polygon is a polygon B0B2 on which the point a is located, it can be determined that the point a is out of the shadow. In the direction of the point b, because the first polygon is a shadow polygon S1 and the next one is a polygon B0B2 on which the point b is located, it can be determined that the point b is in the shadow volume. In case of the point c, there are the shadow polygons S1 and S2 encountered midway, and the line of sight enter in the shadow volume at S1, but exits from it at S2. It can be eventually determined that the point c is out of the shadow volume.

In reality, as in FIG. 25, there are cases in which a viewpoint is already in the shadow volume, or two or more shadow volumes overlap with each other. Therefore, the concept of a shadow level is introduced. This level is incremented or decremented by one at every crossing of the shadow volume and the line of sight, and it is determined that only points with the shadow level of 0 are out of the shadow.

The most significant problem of the shadow polygon process lies in the fact that adding data about the shadow polygons to the existing polygon data increases the number of polygons to be processed, and that, even if the original object is small its shadow polygons occupy a large area on a screen so that the number of polygons impacting a pixel becomes unmanageably large.

(2) Brotman and Badler Algorithm

Some care is necessary to use the process described in (1) together with the Z-buffer process or the scan line Z-buffer process. The explanation of an algorithm by Brotman and Badler that has solved this problem is given below. See L.S. Brotman and N.I. Badler, "Generating Soft Shadow with a Depth Buffer Algorithm", IEEE Computer Graphics and Applications, October 1984, pp. 5–12.

Drawing according to the algorithm is performed as follows by basically assuming that a Z-buffer (depth buffer) is modified to store information needed for shadow generation in addition to depth values.

1) Write all objects within a scene in the Z-buffer with a conventional polygon tiling method (a method for converting polygon data into pixel data).
2) Calculate shadow volumes, and write them in the buffer with the same method. However, at that process, the data of the image is not directly modified, but values of various counters in the data structure (buffer) of the pixel are updated.
3) Calculate the brightness value by taking effects of the shadow into consideration (referring to the values of the counters of the buffer).

FIG. 26 shows a modified (expanded) Z-buffer used in this technique. Each cell in the two-dimensional array corresponds to a pixel on the screen, and has a record structure consisting of five elements. Of course, one of them is the depth value (DEPTH). Others being stored are a pointer to the description of the object (OBJPTR), a normal vector on that pixel (NORMAL), and two pointers for representing the shadow (Sf, Sb). The object pointer and the normal vector need to be stored because the brightness value is not calculated during tiling polygons. The object pointer points description on a polygon seen from an appropriate pixel. One description record is used for each polygon. The description record contains attribute data of the polygon such as color (COLOR), transmittance (TRANSMITTANCE), glossiness (GLOSSINESS) and reflectance (REFLECTANCE) of the polygon that are required in the calculation of the brightness. The normal vector of the buffer is the one at the point of the polygon that occupies the pixel, and is calculated as a value interpolated during tiling the polygon.

In determining whether or not a point is in a shadow, it is necessary to analyze information on a shadow volume surrounding the point (see FIG. 27). FIG. 26 illustrates the data required for prior art shadow generation methods. The Sf pointer points at a list of records that describe front shadow polygons (FSP: a shadow polygon in which an outward normal vector makes an acute angle with a vector directed to the viewpoint). Similarly, Sb pointer points at a list of records that describe back shadow polygons (BSP: a shadow polygon in which an outward normal vector does not make an acute angle with a vector directed to the viewpoint). There is at most one record for one light source in each list of Sf or Sb. In other words, if, for a light source, a polygon occupying that pixel constitutes a hidden-surface by itself, a record for the light source is not necessary. However, it is necessary to provide a memory capacity sufficient to store a number of records corresponding to the number of light sources for each pixel. The record contains an identifier for a light source (LIGHT-SOURCE I.D.), and flags and counters to determine whether or not it is in a shadow.

After the conventional tiling of object polygons into the buffer (setting the depth value, the normal vector, and the object pointer for each pixel according to the Z-buffer process), shadow polygons are rendered in the buffer. In rendering a shadow polygon in the buffer, processing occurs only on an appropriate record (corresponding to the light source generating the shadow polygon) in the list pointed at by Sf or Sb in the expanded Z-buffer. The shadow polygons are rendered by shadow volume. If a point on a pixel (a point set in the conventional polygon tiling) is behind a front shadow polygon, the POINT-SOURCE LEVEL of the appropriate record in the Sf list is set to 1. If the point is before the back polygon, POINT-SOURCE LEVEL of the appropriate record in the Sb list is set to 1. If there is no record in the list, a new record for the light source that generates the shadow volume is added in the list, and then, the above-mentioned operation is performed.

Whenever rendering is completed for all shadow polygons of a shadow volume, inspection of the Sf and Sb lists is made to determine whether or not there is an appropriate record, and whether or not both POINT-SOURCE LEVELs are 1. It is determined that a point satisfying these conditions is contained in the shadow volume, and is in a shadow.

This processing alone is sufficient for a case where the light source is a simple point light source. That is, it is sufficient to set 1 in, for example, DARKNESS LEVEL to store the information that this point has been determined to be in a shadow. (Of course, POINT-SOURCE LEVEL and DARKNESS LEVEL are reset to 0 before starting the rendering of the shadow polygons.)

The paper by Brotman and Badler addresses a light source of finite extent, and provides a technique that makes it possible to draw penumbrae. As conventionally implemented, a light source of finite extent is approximated to a number of equivalent point light sources. Shadow volumes are generated for each point source. For the point sources belonging to the same light source, the degree of a penumbra is determined by a ratio between the number of point sources, which make a point in a shadow, and the number of point sources, which do not make the point in a shadow. To this end, the records in the Sf list are provided with counters OBJECT LEVEL that count the number of point sources belonging to a light source and making the point in a shadow. As described, if it is determined that a point is in a shadow for a shadow volume, OBJECT LEVEL is incremented. At that moment, however, their algorithm processes the shadow volumes for each object polygon causing the shadow volumes (the object polygon corresponds to an object silhouette polygon OSP in FIG. 27). OBJECT LEVEL is accumulated for each object polygon, and the largest OBJECT LEVEL is made DARKNESS LEVEL for the pixel. This prevents duplicated counting of shadows in an area where multiple shadow volumes generated by different object polygons from a point source overlap with each other. Eventually, it supports the point sources for approximating the light source of finite extent by the following procedure:

1) OBJECT LEVEL is reset to 0 every time a new object polygon replaces the old one;
2) Determination of shadow is performed for every shadow volume generated by the object polygon by the above-mentioned technique. For a point in the shadow, OBJECT LEVEL for the appropriate record in the Sf list for the pixel is incremented by one; and
3) After completion of processing on all shadow volumes generated by the object polygon, DARKNESS LEVEL is updated by the current DARKNESS LEVEL or OBJECT LEVEL, whichever is greater.

Once the above-mentioned shadow finding is completed, it is possible to obtain for each pixel such information as attributes and the normal vector of the polygon occupying the pixel, and whether the point is in a shadow for each light source (the degree of penumbra if the light source is of finite extent). The brightness value is calculated for each pixel using this information.

The following problems exist with the preceding algorithm:

1) The largest problem is the limitation that only a convex polygon can be used as a source for generating a shadow volume. If a shadow volume generated by a polygon other than a convex one is allowed, a contradiction arises in that there exists a point that is behind the front shadow polygon, but before the back shadow polygon (that is, satisfying the above-mentioned conditions for shadow finding), but on which light strikes In high speed drawing, because an object is typically represented by segmenting it into triangles or minute convex polygons, the algorithm will eventually generate shadow volumes and finally shadow polygons from segmented polygons, but the required subdivision increases by the number of polygons to be processed.

2) It is necessary to check every shadow volume whether or not each pixel satisfies the conditions for a shadow. However, the above algorithm fails to disclose the method of this check. If the entire space of the buffer is actually checked, efficiency becomes very poor unless some special hardware is provided.

3) Although this may be a problem of trade-off between quality and high speed, or between quality and storage capacity rather than a problem of the algorithm, this method requires a buffer capacity (even for a single point source) about 10 times that for a conventional Z-buffer. Complicated calculation is performed for the calculation of brightness by referencing various information on every pixel on the screen. The algorithm imposes too much emphasis on quality for interactive or real-time display. If a very high quality image is required, it may be sufficient to employ ray tracing or the like taking much time. However, a high speed is essential for animation and previewing data creation or a design process. A method essentially the same as this algorithm is disclosed in Japanese Published Unexamined Patent Application No. 61-133483.

SUMMARY OF THE INVENTION

The present invention is directed toward providing a shadow generation method that makes it possible to directly determine a shadow of a non-convex object, and thus it is free from above described complexity and is able to generate shadows for a concave object without segmenting it into convex objects.

It is also an object of the present invention to provide a shading method that can very easily perform determination of the shadow itself.

In addition, it is an object to provide a shadow generation method that can easily generate shadows for multiple point light sources (including a light source of finite extent).

Furthermore, it is an object to provide a shadow generation method that can significantly increase the processing speed with some deterioration of quality by adopting a quantization technique.

To attain these and other objectives, this invention relates to a method that determines whether or not a point seen on a screen is in a shadow by using a parity of the number of intersections between the line of sight and shadow polygons belonging to a shadow volume.

BRIEF DESCRIPTION OF THE DRAWING

FIGS. 6, 7, 8A-B, 9A-B, 10A-C, 11, 12, 13A-B, 14 and 15A-B are diagrams used to illustrate the operation of the processor according to the present invention.

FIGS. 23, 24, 24A, 24B, 25, 26A-E, and 27 are diagrams used to described prior art shadow generation methods.

DETAILED DESCRIPTION OF THE PREFERRED EMBODIMENT

Figure 2:
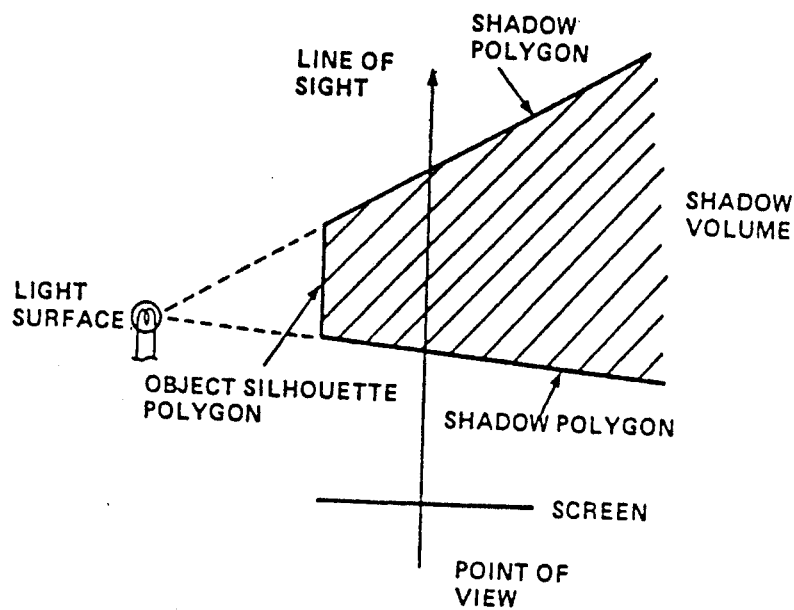
FIGS. 2A-B, 3, and 4 are diagrams illustrating the shadow generation situations addressed by the present invention.
Figure 2:
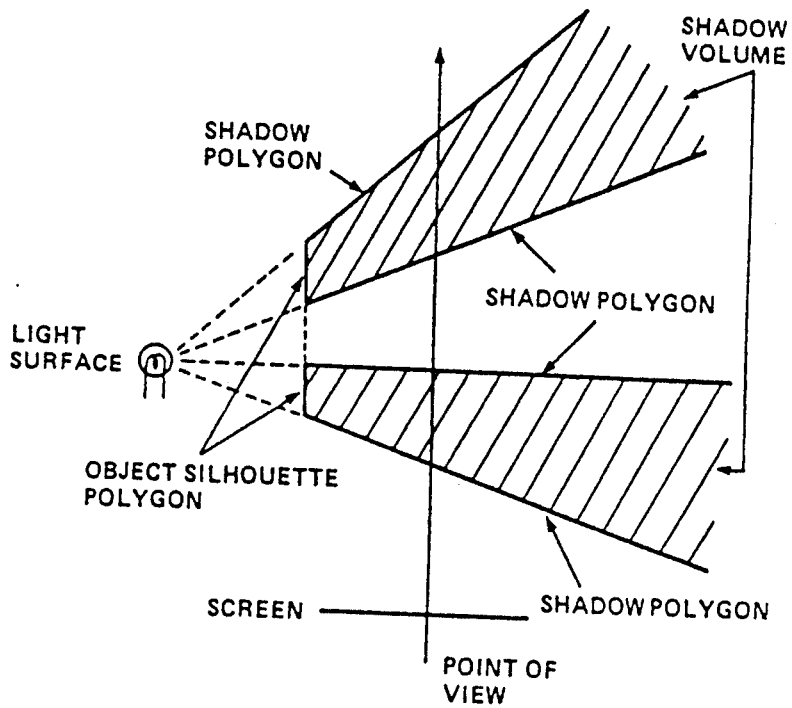
Figure 3:
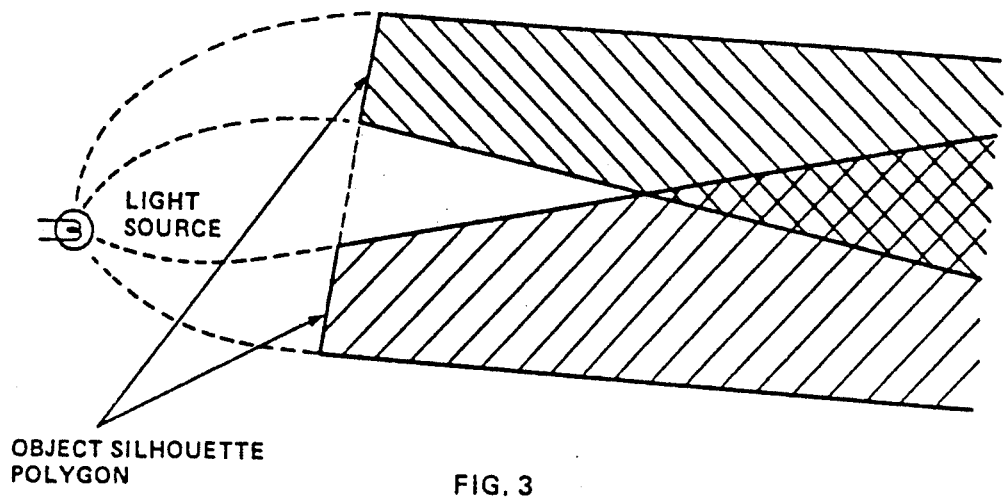

FIG. 2(a) shows a shadow volume generated by a convex polygon, while FIG. 2(b) shows a shadow volume generated by a non-convex polygon. However, these figures are drawn on a plane that is defined by a predetermined scan line and the viewpoint. In the following discussion, this representation will be used without being specified. As seen from FIG. 2, shadow volumes generated by a convex or non-convex polygon do not overlap because of the linearity of light, even if more than one shadow area is generated on a plane as in FIG. 2(b). In other words, the overlapping shadow condition shown in FIG. 3 never exists. Thus, in the case of FIG. 2, it is found that an area in a shadow is found to be that area in which a line from the point of view to that area intersects the shadow polygon(s) an odd number of times.

Figure 4:
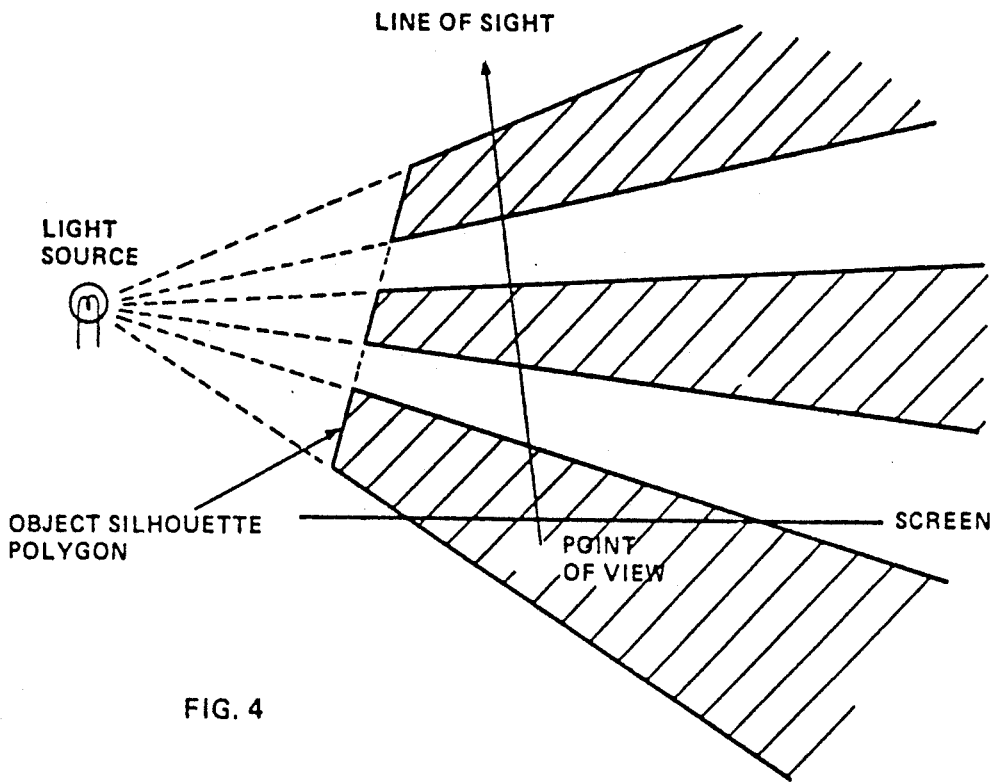

However, where the viewpoint exists in a shadow volume, as shown in FIG. 4, light strikes on an area where the line of sight intersects the shadow polygon at an odd number of places, while a shadow covers an area where it intersects the shadow polygon at an even number of places.

The present invention relates to the method for determination of a shadow by determining whether or not there is a shadow based on the parity of the number of intersections between the line of sight and shadow polygons and whether or not the viewpoint is in a shadow volume.

In addition, when multiple light sources are treated, the invention independently determines the shadow for each pixel position by light source, then finds the number of cases where there is a shadow for each pixel position, and to determine the darkness of the shadow according to that number. In this case, only one type of counter needed to count the number of shadows found, which leads to a simplification of the arrangement. As described for the prior art method, two types of counter (storage areas) are typically required because it is first necessary to determine how many light sources cast shadows on a pixel position for each object silhouette polygon, and then to determine the largest number of times represents the darkness of the shadow on the pixel position.

Also, in the case where the light sources are separated from each other, and it is necessary to consider characteristics of each of them, that is, where the darkness of the shadow varies based on an angle between each light source and the normal vectors of the polygons, the present invention is arranged to classify and quantize these normal vectors making it possible to perform high speed processing.

In addition, the invention is arranged to provide information that prescribes a range of processing in processing a shadow volume, and avoids unnecessary calculation.

OVERVIEW OF THE SYSTEM

Figure 5:
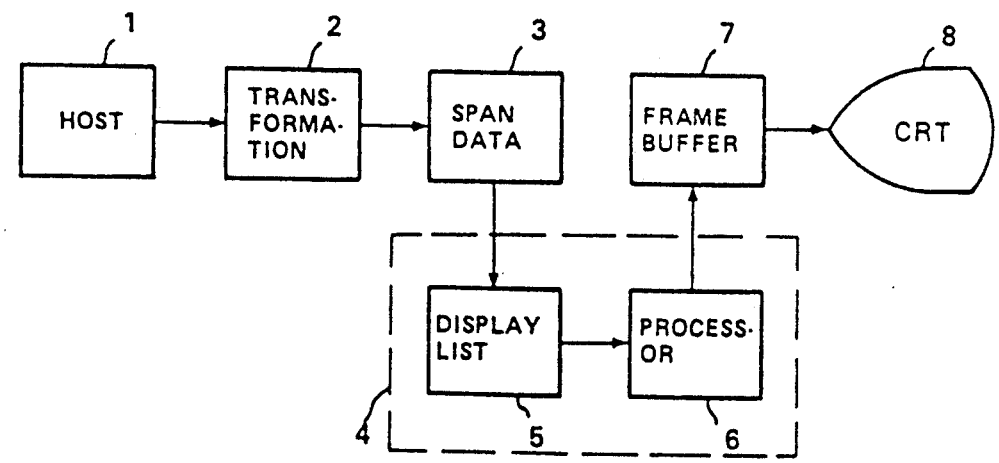
FIG. 5 is a block diagram showing an overall arrangement of components in a graphics system according to the preferred embodiment.

FIG. 5 shows a graphics system embodying the present invention. In the figure, the graphics system generates pixel data by processing a polygon-segmented surface model, and displays the pixel data on a display screen. The basic functions of the graphics system include hidden-surface elimination, Gouraud shading, and shadow generation.

A graphics application is executed on a host computer 1 to supply polygon data represented in world coordinates, that is, coordinates and color information of each vertex of a polygon, as well as similar shadow polygon data, to a transformation section 2. The transformation section 2 transforms the data to screen coordinates and depth data on the screen through a perspective transformation and a scale transformation. A span data generation section 3 generates span data for each scan line, on which the polygon is found, from the transformed polygon data by a technique such as DDA (digital differential analyzer).

Figure 7:
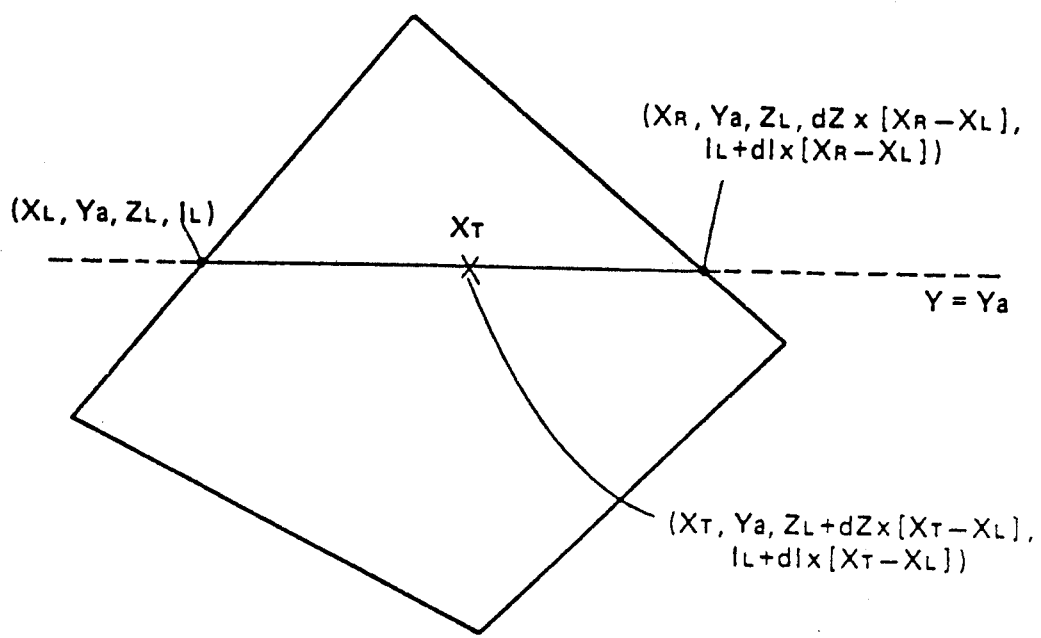

The span data is as shown in FIG. 7. It should be noted that the figure shows only data used for scan line Z-buffer processing and Gouraud shading for convenience. A description of this follows.

Figure 6:
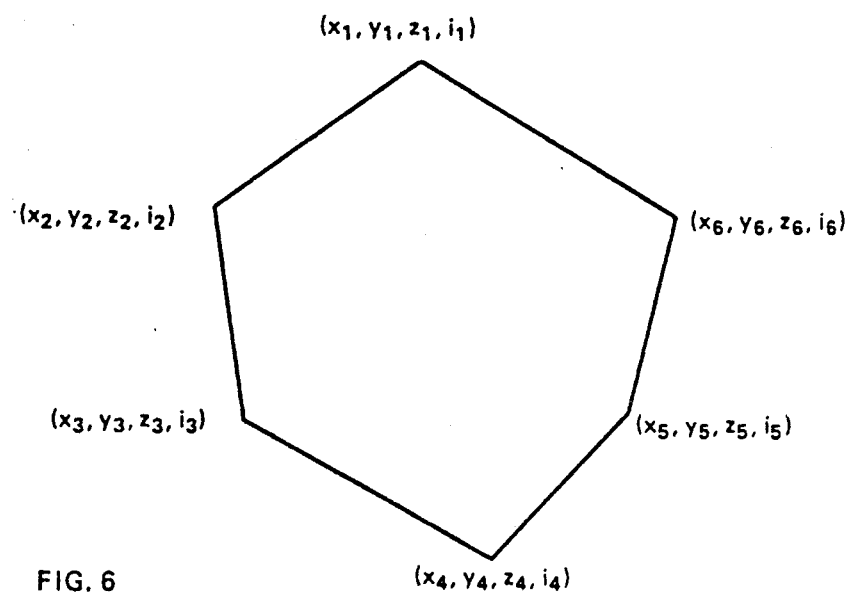

First, the notation is described. The notation will be used on the description of the span data unless otherwise specified. On the rectangular coordinate system (screen coordinate system) it is assumed for convenience that the coordinate axes coincide with the scanning direction of the scan line, that is, the x coordinate value increases from left to right, and the y coordinate value increases from top to bottom. It is also assumed that xn and yn are the x and y coordinates of the n-th vertex on the screen, respectively, zn is the depth value of the n-th vertex, and in is the brightness value of the n-th vertex (FIG. 6). Of course when color is supported, the number of the brightness value for one point is plural, that is, one for each color, for example, red, green and blue. Here, it is assumed that the number of the brightness value is one for one point to simplify the description.

In Gouraud shading, drawing is performed by linearly interpolating the depth value and the brightness data specified for each vertex of the polygon on the screen. Most systems first create span data for each scan line, and then interpolate the span data in the direction of the scan line (many workstations execute this interpolation with hardware). Here, the span data means data that represents portions of the polygon to be drawn covering a specific line, and typically contains the following data (FIG. 7):

(XL, XR, ZL, dZ, IL, dI)

XL and XR represent the x coordinates at each end of the span, and are assumed here for convenience to be ones at the left and the right ends, respectively. ZL and IL represent the depth value and the brightness value at XL, respectively. dZ and dI represent per pixel variation of the depth value and the brightness value when shifting from XL to XR on the scan line (the difference is a constant because of the linear interpolation). Thus, the interpolation of the span data is conducted from XL or XR by adding dZ and dI to the depth value and the brightness value for each pixel. In case of color shading, the description above applies but the consideration of dI is eliminated because coloring is performed with constant brightness for the same polygon.

The preferred embodiment of the present invention expresses the span data as follows by including attribute data (ATTR) in addition to the above data:

(ATTR, XL, XR, ZL, dZ, IL, dI)

The attribute data is to distinguish shadow polygons from ordinary polygons and to perform shadow generation, and takes the following four values.

OP: Span of an ordinary polygon that is not a shadow polygon (Ordinary Polygon)

SP: Span of a shadow polygon (not EV nor IF) (Shadow Polygon)

EV: Span of the last shadow polygon in one shadow volume (End span in a Volume)

IF: A kind of span of a shadow polygon accompanying action to invert a shadow determining flag (Invert Flag)

Here, EV is provided because it is necessary to perform the shadow finding for each shadow volume as described above. That is, it is necessary to determine at each pixel position for each shadow volume whether or not a point occupying a pixel position is in a shadow from the parity of the number of intersections between a shadow polygon and the line of sight. Therefore, the span data is processed for the polygons belonging to one shadow volume. The end of each shadow volume is represented by EV.

IF relates to the position of a viewpoint. That is, to inspect the parity by the shadow finding flag, the flag is inverted each time that a shadow polygon intersects the line of sight. However, as described in FIG. 4, if the viewpoint is contained in the shadow volume, the parity in determining the shadow is inverted. Thus, if the viewpoint is contained in the shadow volume, the shadow finding flag is inverted by providing the attribute IF for one of the span data for the shadow volume. Whether or not the viewpoint is contained in the shadow volume can be determined by performing the hidden-surface removal on the object polygon or object volume, which is the original in creating the shadow volume, together with the viewpoint by using the light source as a temporary viewpoint. If the original viewpoint is visible, it is out of the shadow volume, and, if it is invisible, it is contained in the shadow volume.

The description continues with reference to FIG. 5.

Figure 8:
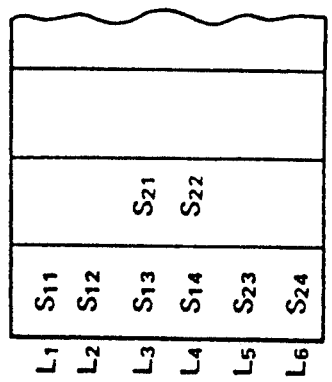
Figure 8:
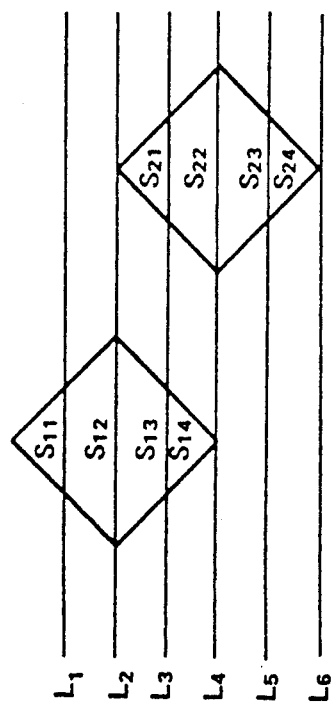

A pixel conversion section 4 is used to generate, from the span data, pixel data on which the hidden-surface removal, Gouraud shading and shadow generation are performed. The pixel conversion section 4 arranges the span data of each polygon from the span data generation section 3 by scan line as shown in FIG. 8, and stores them in a display list memory. In FIG. 8, L indicates the scan line, and S indicates the span. It should be noted that the figure is exaggerated. This storing is done because a pipeline type processor 6 in the later stage receives the span data of all polygons by scan line, and generates pixel data. The pixel data from the pipeline type processor 6 is stored in a frame buffer 7, and supplied to a CRT (cathode ray tube) 8.

Figure 1:
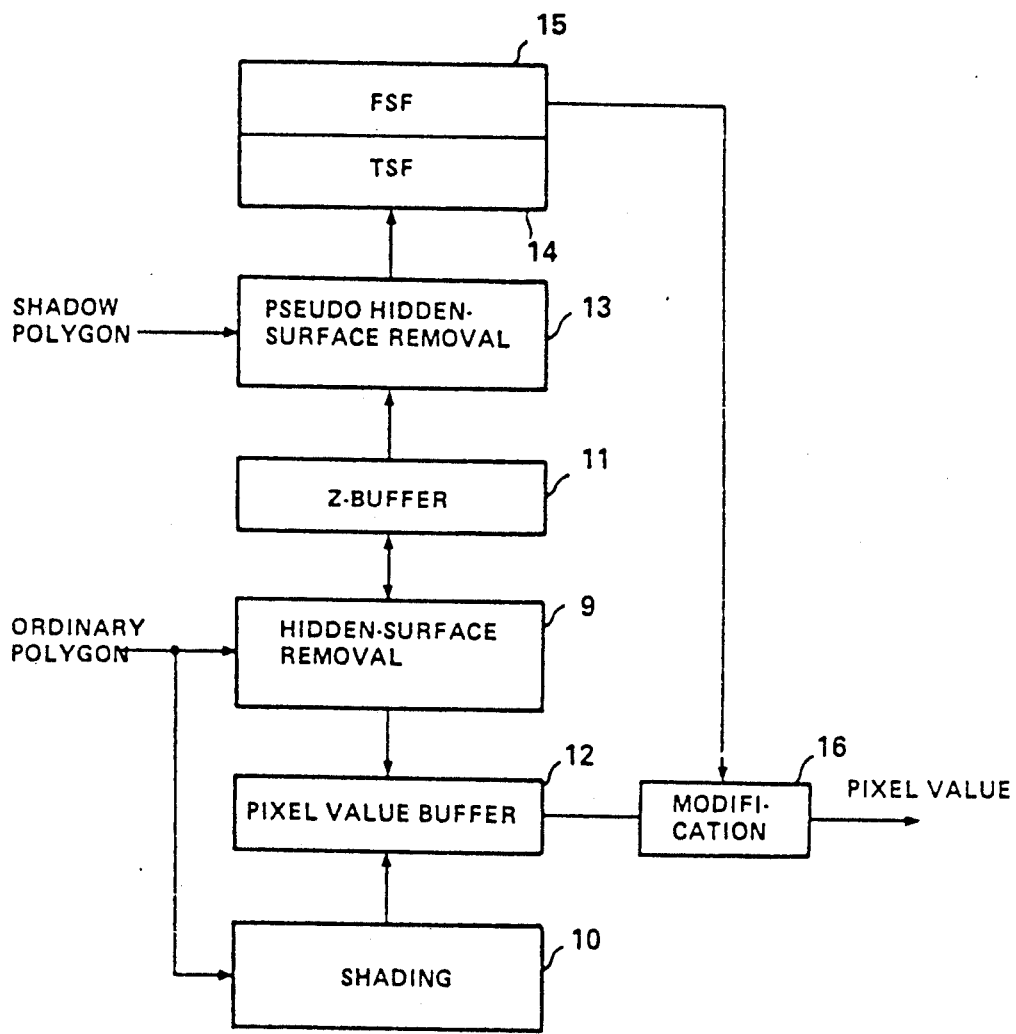
FIG. 1 is a block diagram illustrating the functional components of a processor embodiment according to the present invention.

The main functions of the pipeline type processor 6 are those shown in FIG. 1. Their detailed arrangements will be described later.

Processor 6 may encounter a problem determining the order in which to process the span data when the span data on a given scan line are interpolated data for each pixel. The order is:

1) First, to process all span data of the ordinary polygon, and

2) Then, to process span data of the shadow polygons for each shadow volume.

Figure 11:
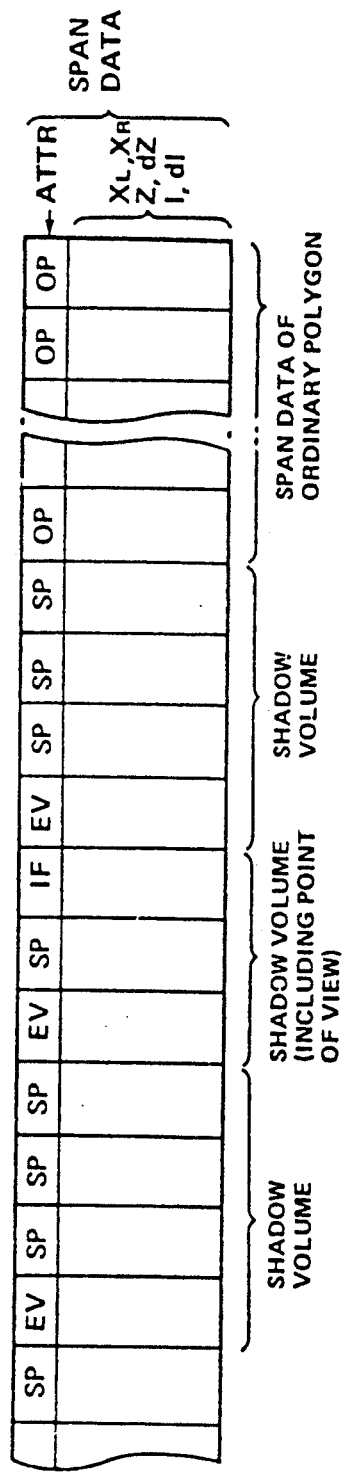

FIG. 11 shows an example of input in the processing according to such order (processing proceeds from right to left).

In FIG. 1, processing is executed by scan line. The processing for a line is as follows. First, the span data on ordinary polygons, that is, the polygons representing objects, is supplied to a hidden-surface removal section 9 and a shading section 10. The hidden-surface removal section 9 interpolates the depth data z of each pixel position on the appropriate span data, and compares it to the depth data z' in a Z-buffer 11 (FIG. 9(a)). The Z-buffer contains the depth data of a previous polygon.

However, if this is the first data on the scan line, an initial value, for example, the background depth position, is stored. The hidden-surface removal section 9 is arranged to leave the depth data at the value nearest the view point at each pixel position. In the example in FIG. 9(a), circled input data z are nearer the viewpoint than the data z' in the Z-buffer, and thus, the content of the Z-buffer is changed as shown in FIG. 9(b).

On the other hand, the shading section 10 generates a shaded pixel value I based on the span data. At that moment, the shading section 10 updates data I' in a pixel value buffer 12 by reflecting the processing in the hidden-surface removal section 9. That is, it is arranged to write those new pixel values 1, which are generated base on the span data, and the depth data z of which are determined to be newly written in the Z-buffer 11, in the pixel value buffer 12 (FIG. 9 (b)). Such processing is executed for the span data of all polygons that are on the appropriate scan line, so that only data at the side nearest to the appropriate scan line are displayed.

After completion of the processing of the hidden-surface removal and the Gouraud shading on all ordinary polygons of the appropriate scan line, the shadow polygons are processed. The span data of each shadow polygon is sequentially supplied to a pseudo hidden-surface removal section 13. This section interpolates the depth data z of the shadow polygons from the span data, and compares them with the defined depth data z' in the Z-buffer 11 after the above hidden-surface removal at each pixel position. At that moment, if the depth data z' in the Z-buffer 11 is deeper than the depth data z of the shadow polygon at the pixel position, the line of sight is determined to cross the shadow polygon. On the other hand, if the depth data z' in the Z-buffer 11 is at the near side, it does not cross the shadow polygon. If it crosses, a temporary shadow finding flag 14 is inverted. On the other hand, if it does not cross, the temporary shadow finding flag 14 is left as it is. In the example of FIG. 10, circles indicate the intersection of the line of sight. Thus, the shaded portions are inverted. FIG. 10(b) shows a case where ATTR is IF, that is, a case where the viewpoint is in the shadow polygon, and therefore, the manner of inversion differs from the other. In addition, in FIG. 10(c), ATTR is EV, so that the temporary shadow finding flag data is transferred to a final shadow finding flag buffer 15. The functions of the pseudo hidden-surface removal section 13 are virtually same as those of the hidden-surface removal section 9, which is commonly used for this.

Once the span data of all shadow polygons are processed for the scan line, the defined final shadow finding flag data is supplied to a modification section 16 to change the pixel values for generating shadows.

The above-mentioned processing is repeated for the other scan lines.

Obviously, in this embodiment, it is not necessary to create shadow volumes by segmenting a non-convex polygon into convex ones. In addition, the processing speed for this embodiment can be improved by processing higher level data of the polygons.

For example, certain modern graphics systems hold not only the polygon data, but also higher level geometric data (data indicating what volume the polygons construct) for easiness in modeling for high speed drawing. The number of shadow volumes to process can be significantly reduced by creating the shadow volumes directly from the geometric data.

For example, for a shape as shown in FIG. 12, it is sufficient to prepare only one shadow volume for the shape, resulting in the determination that nine is a sufficient number of shadow polygons for a light source at the position shown in FIG. 13. That is, it is sufficient to create shadow polygons for edges AB, AM, EF, EG, FO, GL, NO, KL, and BI.

However, attention should be paid on the shadow polygons created from the edges BI and KL. For example, it is impossible to conventionally make the shadow polygon created from the edge BI a polygon surrounded by a line beyond a point B through the point B from the light source, a line beyond a point I through the point I from the light source, and the edge BI. Although the shadow finding process according to the embodiment does not permit shadow polygons to intersect with each other in the same shadow volume, the shadow polygon created from the edge BI as above intersects the shadow polygon created from the edge KL.

Figure 14:
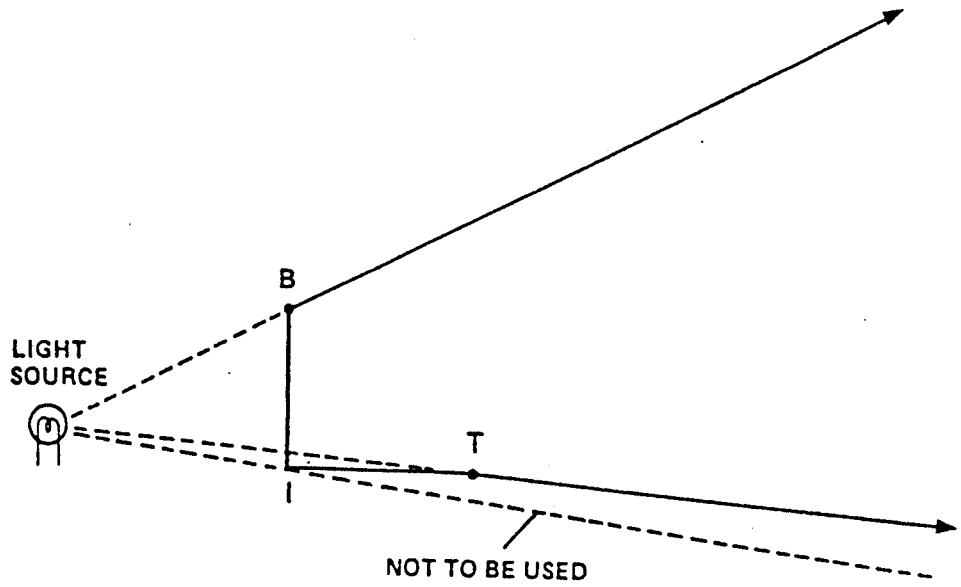

Therefore, as shown in FIG. 14, a shadow polygon for the edge BI is created by finding an intersection point T between the plane containing the edge BI and the light source both and the edge KL. For the edge KL, a shadow polygon is created by using the line TL. It is possible by performing the hidden-surface removal on the volume from the light source to determine which edges of an object volume are used for creating the shadow polygons, to find edges that should be treated in the same manner as the above-mentioned edge BI, and to find which other edge the shadow polygon created from the edge intersects. This hidden-surface removal is performed only on the polygons constructing the volume, and requires a smaller amount of calculation.

As described, it is possible to create shadow volumes and the shadow polygons constituting them for each object volume (shape), and to significantly reduce the number of shadow polygons. The shadow finding process according to the invention can simultaneously treat a number of shadow volumes unless shadow polygons overlap each other (it is not necessary to perform the shadow finding by shadow volume). Thus, it is also possible to find an optimum set of shadow polygons for a number of volumes by performing the hidden-surface removal from the light source. (The number of the shadow polygons in the optimum set corresponds to the number of shadow volumes.) However, the operation becomes complicated for eliminating intersections of polygons with each other (corresponding to creation of the shadow polygon for the edge BI).

Figure 15:
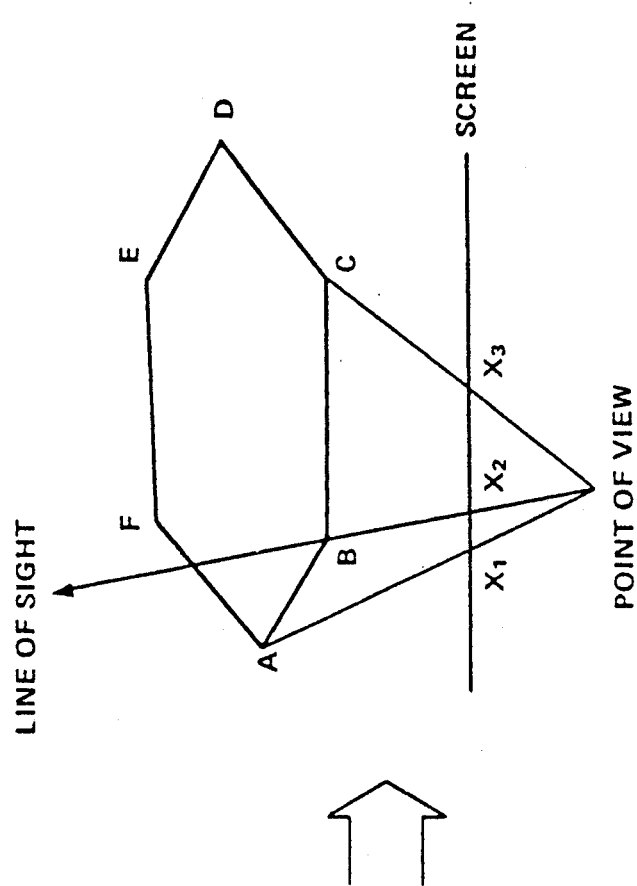
Figure 15:
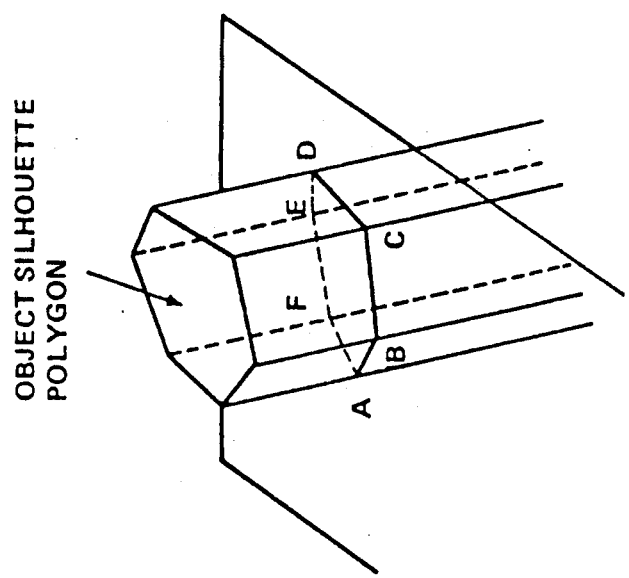

The present invention uses the parity of the number of intersections between the line of sight and the shadow polygons for finding the shadow. This causes a problem at a joint between shadow polygons belonging to a shadow volume. As in FIG. 15, if span data is created by making (X1, X2) and (X2, X3) (XL, XR) for AB and BC, the intersection at X2 or point B is counted twice, and points on the line of sight passing through the point B are not found to be in a shadow even if they are in the region ABCDEF. Rather, points outside of the region may be found to be in a shadow.

Thus, the span data of shadow polygons are created in such a manner that the range (XL, XR) of the span does not overlap one another for each set of shadow polygons sharing an edge. Particularly, if two end points of the span are assumed to be X1 and Xr, inconvenience can be avoided by specifying the range of span with all polygons of $(X1, Xr-1$ (or $(X1+1, Xr))$. Thus, (X1, X2−1) and (X2, X3−1) are specified in the previous example.

Also, the preferred embodiment cannot process Gouraud shading including a highlight effect when the residual light level (RBL) is not "0". This is because the highlight effect remains even in a shadow area. This is only a matter of trade-off with the storage capacity (or hardware capacity), however, and if brightness values are held for each pixel by dividing them into the brightness value (IB) caused by a highlight effect and a diffused light effect and the brightness value (RB) caused by residual light, it becomes sufficient to make IB+RB the brightness value of a pixel of FSF (final shadow flag)=0, and only RB its brightness value if FSF=1.

Similarly, if Gouraud shading is unsatisfactory for the shading process, and the amount of hardware storage can be increased, a more complicated shading process may be used.

DETAILS OF PIPELINE TYPE PROCESSOR

The pipeline type processor 6 will now be described in detail.

Figure 16:
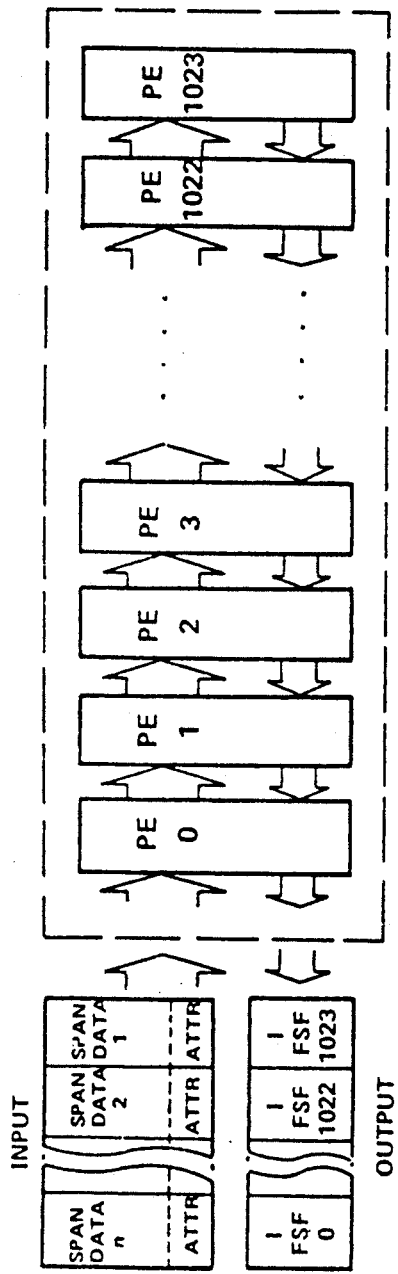
FIG. 16 is a block diagram showing the structure of the pipeline type processor of FIG. 1.

FIG. 16 shows an overall diagram of a pipeline type processor 6. The span data of ordinary polygons and shadow polygons on one scan line are sequentially input to the processor. As shown in FIG. 11, the span data first for the ordinary polygons and then for the shadow polygons are sequentially input and processed. After completion of the shadow polygons, a pixel value I and a final shadow finding flag FSF are output for each successive pixels. Processing elements PE, one for each pixel in one scan line (1024 for this example) are arranged in the processor 6 as a chain. Each processing element PE has a specific value ID. The value is 0, 1, 2, 3, ... 1023 from the input side of the span data. Each processing element PE corresponds to one pixel of a scan line. A processing element PE receives the span data from the previous processing element PE, changes its internal state if required, and also the span data, and supplies them to the processing element PE in the next stage.

Figure 17:
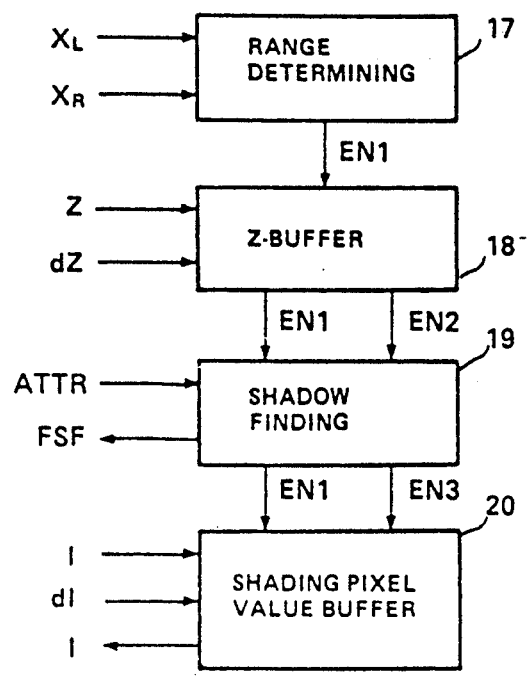
FIG. 17 is a block diagram showing the functional components comprising each of the processing elements of the processor of FIG. 16.

FIG. 17 shows details of the processing element PE. In the figure, the processing element PE consists of a range determining section 17, a Z-buffer section 18, a shadow finding section 19, and a shading pixel value buffer 20. The range determining section 17 receives the lateral limit values XL and XR of the span. This section supplies an enable signal EN1 to the Z-buffer section 18 when its ID lies between XL and XR. The signal EN1 is also supplied to the shadow finding section 19 and the shading pixel value buffer 20. Therefore, the processing element PE only operates on the span data relating to itself.

The Z-buffer 18 is arranged to store the depth data of a corresponding pixel position. The Z-buffer 18 also receives values Z and dZ from the span data, and calculates the depth data of the pixel position (Z+dZ). In case the span data relates to an ordinary polygon, it updates the data if the calculated depth data is larger than the stored depth data. It also supplies an update enable signal EN2 for the pixel value to the shading pixel value buffer 20. On the other hand, in a case of a shadow polygon, it supplies to the shadow finding section 19 an enable signal EN3 to invert the temporary shadow finding flag TSF. This corresponds to a case where the shadow polygon is intersected by the line of sight.

The shadow finding section 19 is entered with ATTR among the span data. If ATTR is IF, the temporary shadow finding TSF is inverted. This corresponds to a case where the viewpoint is in the shadow volume. If ATTR is EV, the content of the temporary shadow finding flag TSF is transferred to the final shadow finding flag FSF (FSF←FSF or TSF).

The shading pixel value buffer 20 is supplied with I and dI from the span data. The shading pixel value buffer 20 performs Gouraud shading based on I and dI, and performs writing in the buffer according to the enable signal EN3.

Once processing is completed for all ordinary polygons and shadow polygons for one scan line, the shadow finding section 19 and the shading pixel value buffer 20 supply the final shadow finding flag and the pixel value, respectively.

Figure 18:
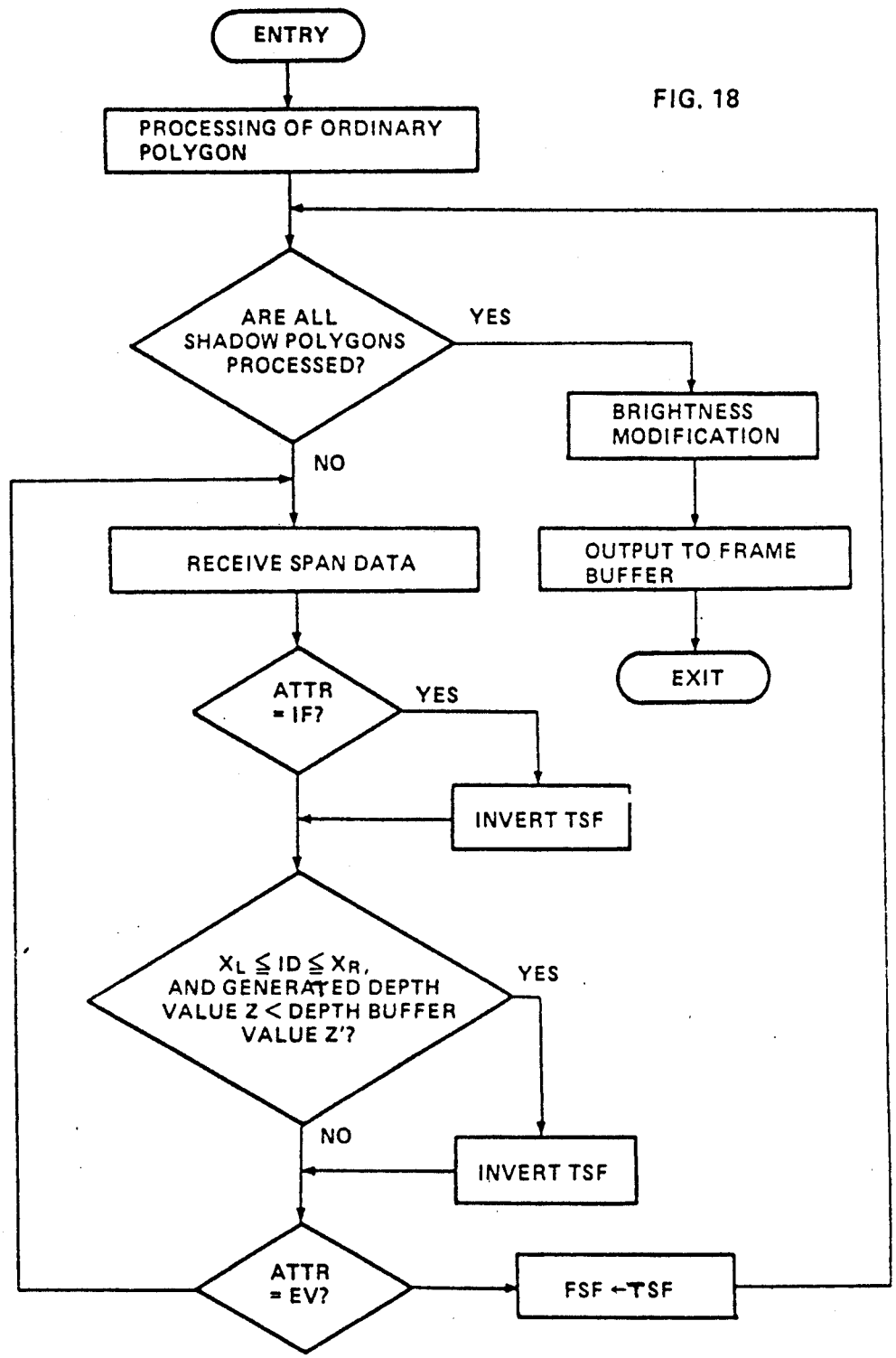
FIG. 18 is a flowchart illustrating the operation of the preferred embodiment of the present invention.

FIG. 18 is a flowchart illustrating the above-mentioned processing. Because the content of the flowchart is self-explanatory from the figure, its detailed description is omitted.

LIGHT SOURCE OF FINITE EXTENT

A description of how to create a shadow of a light source of finite extent is provided.

As in the prior art, the light source of finite extent is treated by approximating it with a number of equivalent point light sources. Shadow volumes are created for each point source, and a degree of penumbra is determined by the ratio of the number of point sources which cast a shadow on a point, to the number of point sources which do not cast a shadow on the point. This method for finding the degree of penumbra is a good approximation in case where an object to be displayed is separated from the light source when comparing it with the extent of the light source. It is necessary to count for each pixel how many point sources cast shadows over the points occupying the pixel. To this end, one counter (P_COUNT) is prepared for each pixel on the scan line on which the span data is interpolated.

Figure 19:
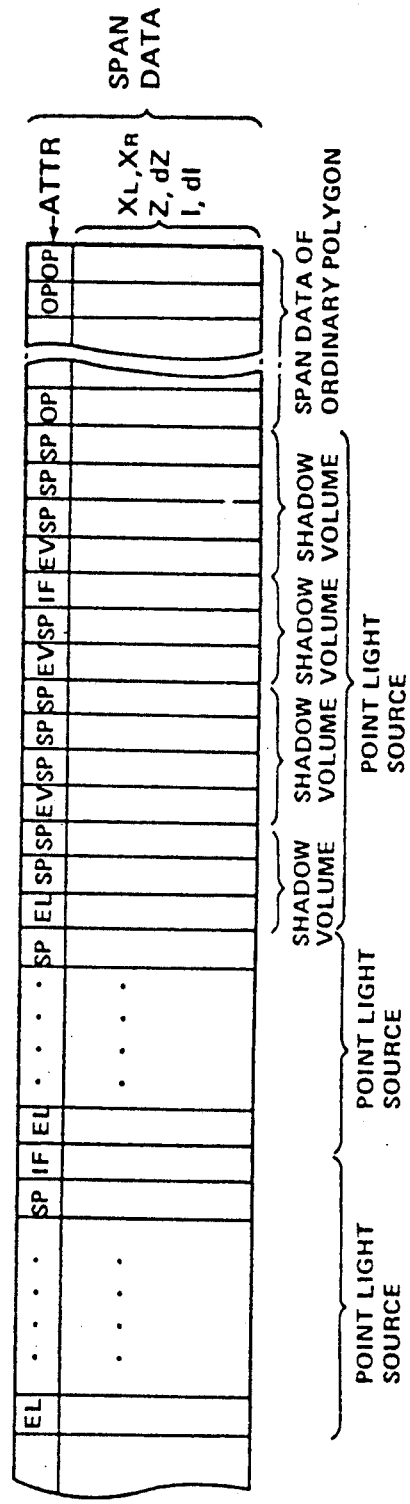
FIG. 19 is a diagram illustrating data required for processing a light source of finite extent.

This example differs from the aforementioned algorithm by Brotman and Badler, but processes the shadow volumes for each point source (see FIG. 19). This makes operation possible with only one type of P_COUNT counter. The algorithm by Brotman and Badler requires two storage areas with multiple bit width of OBJECT LEVEL (equivalent to P_COUNT) and DARKNESS LEVEL for each pixel. In addition, an attribute called EL (End span by a Light source) for indicating the last span data for one point source is added as a value that the attribute item of the span data can take.

In interpolating the span data of the ordinary polygon, the brightness value is complemented and determined (the shadow is not considered). The brightness value used is for accumulation of light from all point sources.

MULTIPLE POINT LIGHT SOURCES

Multiple light sources can be supported by natural extension of the above technique. One way of extension is to interpolate the brightness value on the buffer for each light source when expanding the ordinary span data. Another way is not to interpolate the brightness value in expanding the span data, but to store identifiers and normal vectors for the polygon, and then to calculate the brightness value pixel after pixel. However, the former requires a buffer that stores the brightness values and the number of the light sources for each pixel, while the latter requires reference to various information in performing the calculations for each pixel, and takes much time even if it is incorporated in hardware. Of course, these two methods are expected to be executed at a high speed because circuit integration and speed will be increased in the future.

An alternate embodiment of the present invention employs a technique that introduces an approximation method of accumulated brightness calculation through modification of the above two methods, and trades off increased hardware to achieve high speed calculation for each pixel. The above described technique is used except for the calculation of the brightness values and other processing for multiple light sources where the alternate embodiment may be used.

The method for calculating the brightness is first described. It is assumed that the light source is substantially separated from the object with the result that the direction of light from each light source is constant. If this assumption is not met it becomes necessary to carefully calculate the brightness for each pixel based on the normal vector and other information, or to find direction vectors from the light source to each pixel by expanding and storing the span data, which increases amount of calculation or hardware. The following discussion requires the assumption to be met.

The brightness value is found using the fact that, if a normal vector is identified, contribution on the point from each light source can be determined. However, it is not efficient or fast to calculate the brightness value from the normal vector after completion of the expansion of the span data and the shadow finding (the algorithm by Brotman and Badler essentially does this). In such a method the span data is first expanded by using the brightness value, which accumulates the contributions of all the light sources with assumption of no shadow, using the normal vectors of the polygons together with the span data elements. Then, the brightness value is corrected for each pixel by using the normal vector and the information of the shadow. If this is performed the same way it takes as much time as the case where the calculation is performed on only the normal vector. An improvement can be obtained by using the normal vector, classified and somewhat coarsely quantized, to look up a table that contains indexes indicating those classes, and a ratio of how much the brightness value is corrected (reduced) by the shadow cast by each light source. The corrected brightness value is determined to be the value obtained from the table multiplied by the brightness value held in the pixel.

Figure 20:
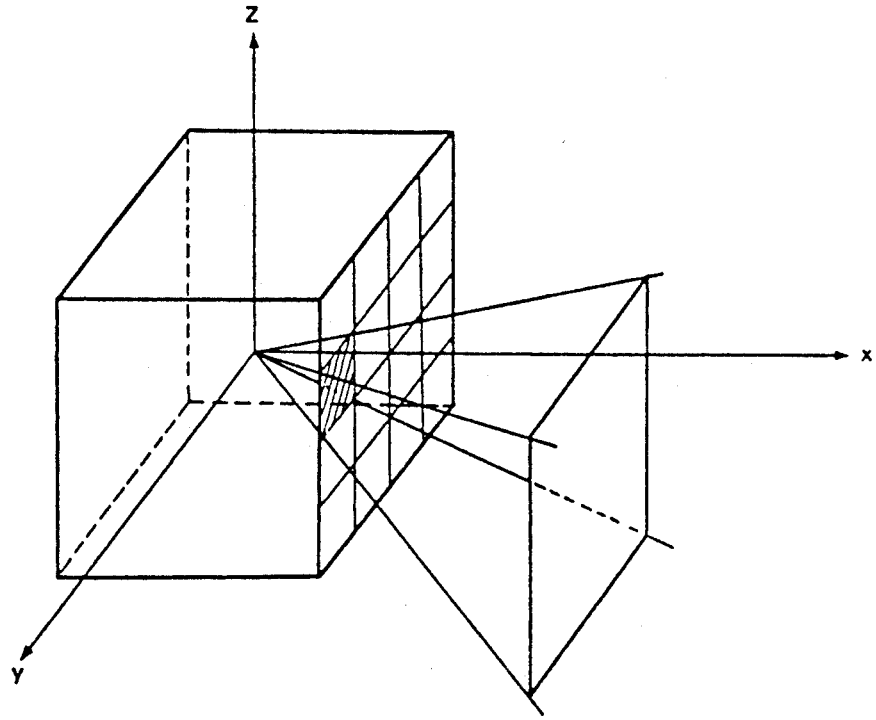
FIGS. 20 and 21 are diagrams illustrating the concept and data required for processing multiple light sources of finite extent.

The classification of normal vectors is described in more detail by referring to an example. Assume a volume as shown in FIG. 20, each face of which is divided into $N \times N$ areas (in the figure, $4 \times 4$). The classification is made by determining where the normal vector is contained in each pyramid when assuming a pyramid created by the center of the volume and each of the $N \times N$ rectangular areas, the center of the volume being the starting point of the normal vector. In this example, numbering (indexing) can be attained with an integer of 1 to $6 \times N \times N$. Larger N provides better approximation in the calculation of the brightness. However, if the number of light sources to be supported is M, it becomes necessary to have a table that stores a correction ratio with a size of $6 \times 2^M \times N \times N$. However, because the final brightness value is a discrete value, There is no need to overly segment. For example, of $N=16$, $M=4$, and the value stored in the table is 4 bytes, the size of the table becomes 96K bytes.

When the number of light sources to be supported in this system is M, it is necessary to have M flags that store which light sources cast a shadow on each pixel. In addition, if the index for classifying the normals is a value of 12 bits, the amount of increase in the storage for each pixel when the above-mentioned two flags of DSF and FSF are added is $M+12+2$ as compared with the case where no shadow generation is performed. It is assumed that the index for classifying the normal vectors on each pixel is NID (Normal Index in Direction), and that an array of flags for the point sources is represented as LM[n](Light Mask: LM[0 . . . M−1]). In addition, it is assumed that, if only LM is represented, it means that LM[0] to LM[M−1] are considered to be unsigned integers of M bits. The table for modifying the brightness is assumed to be BT[n, m] (Bright Table: BT[0 . . . $6 \times N \times N-1$, 0 . . . $2^{M-1}$]). In this table, values are previously calculated and set from the combination of directions of the normal vectors, the light sources casting shadows and directions of light from the light sources.

Figure 21:
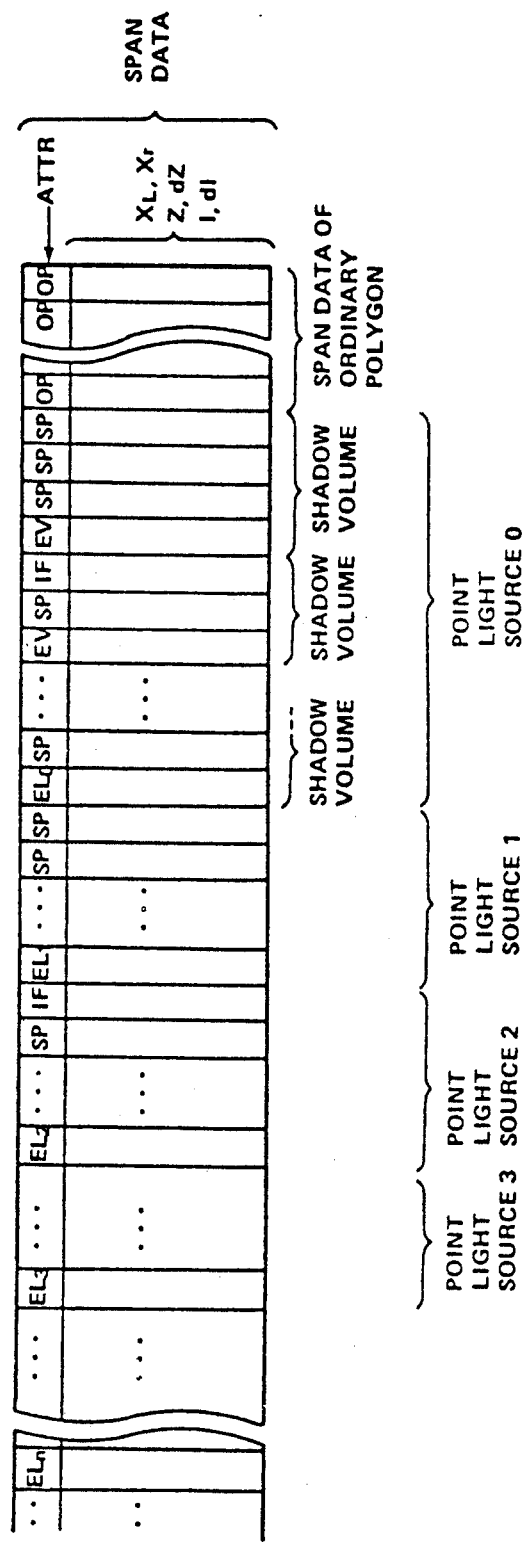
Figure 23:
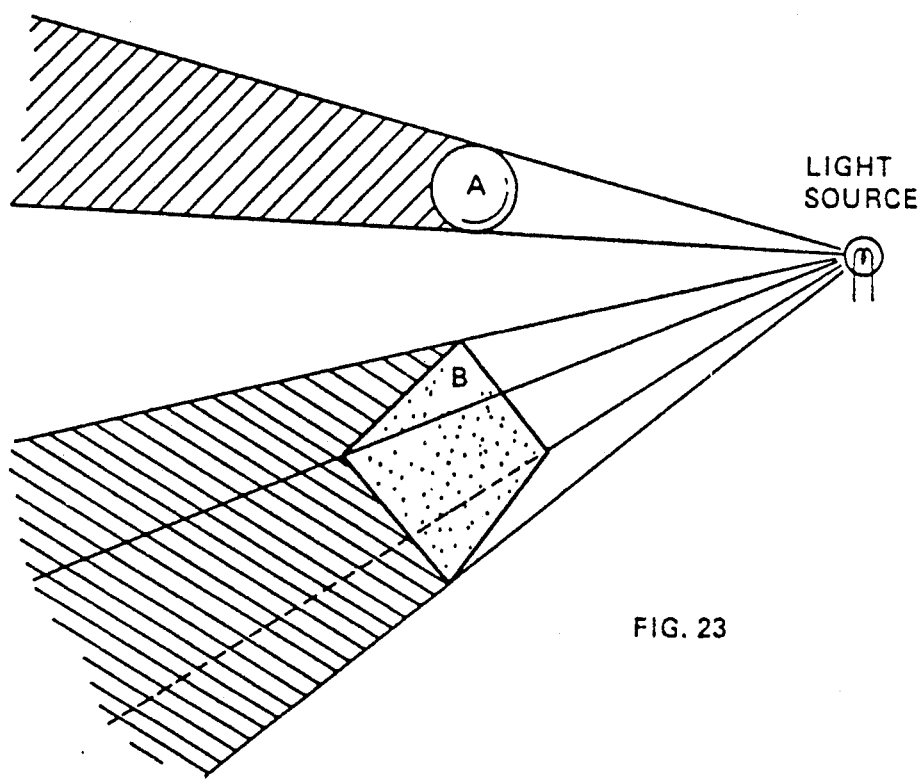
Figure 24A:
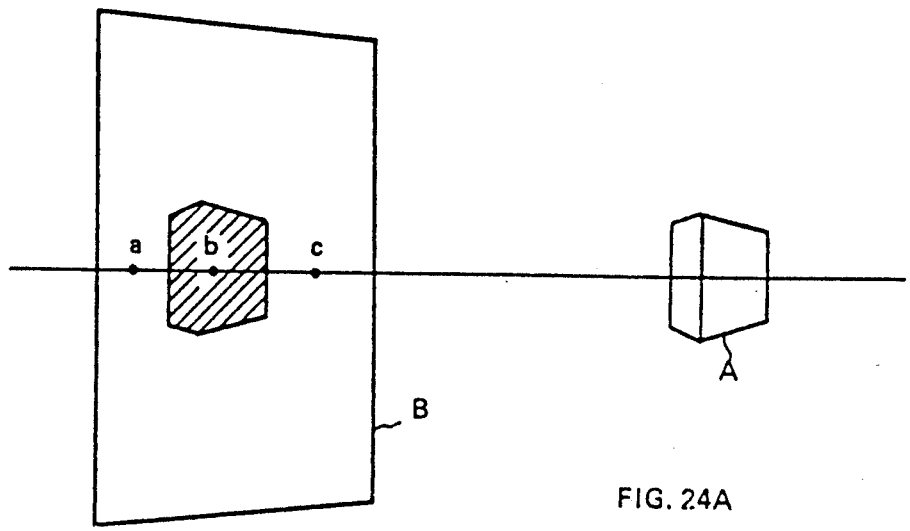
Figure 25:
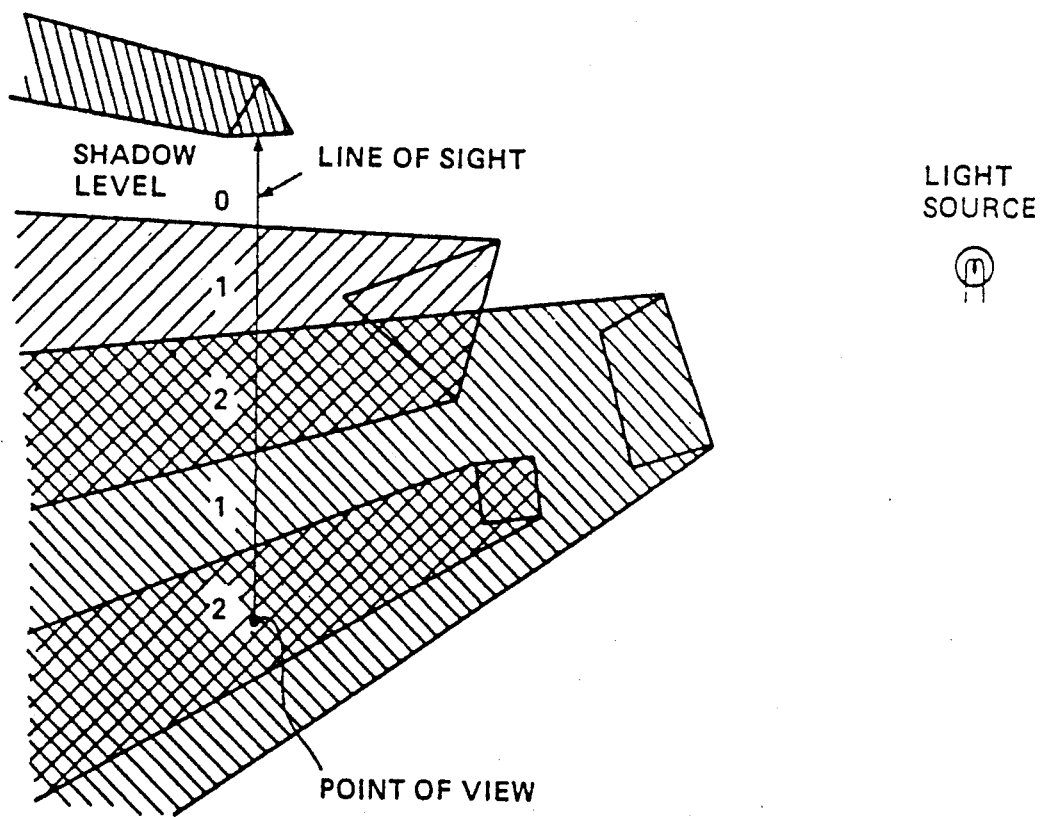
Figure 24B:
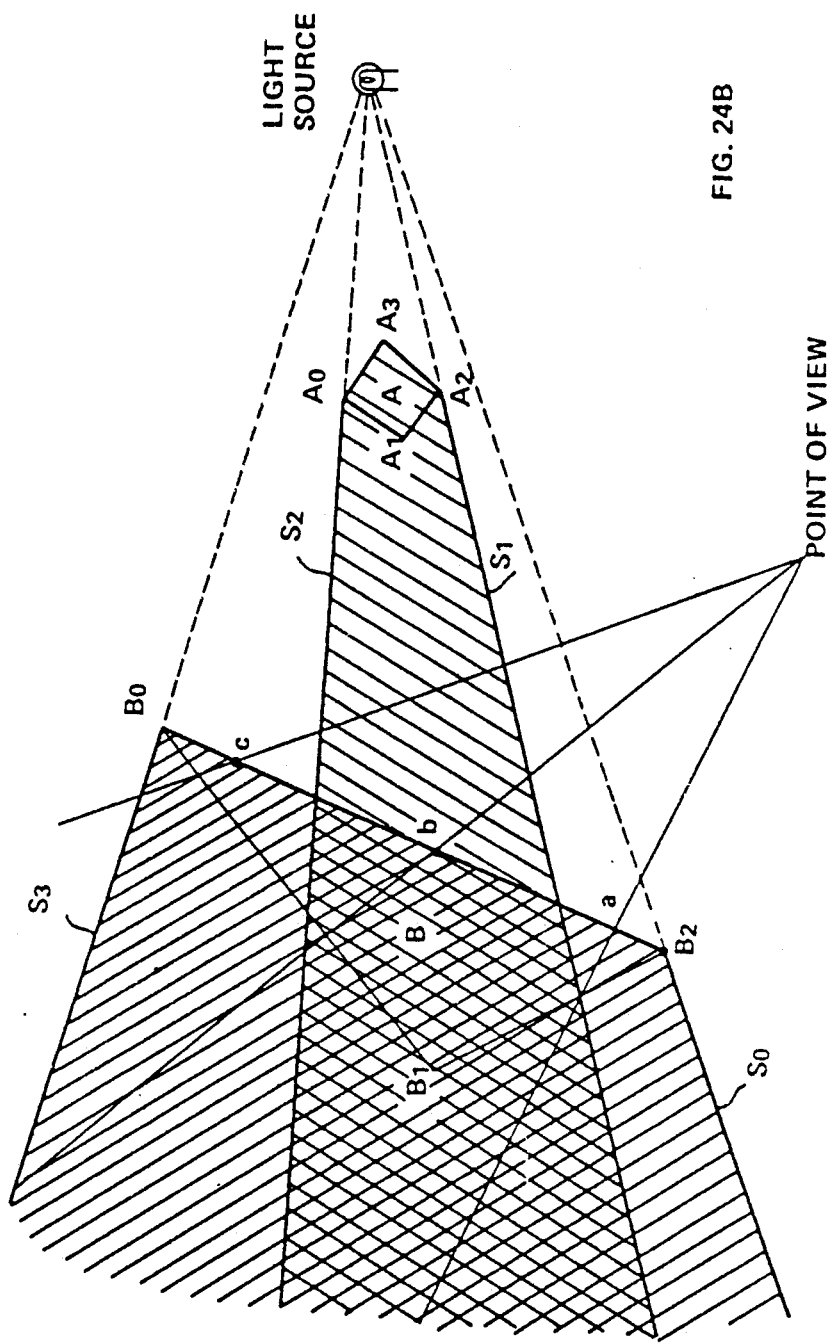
Figure 26:
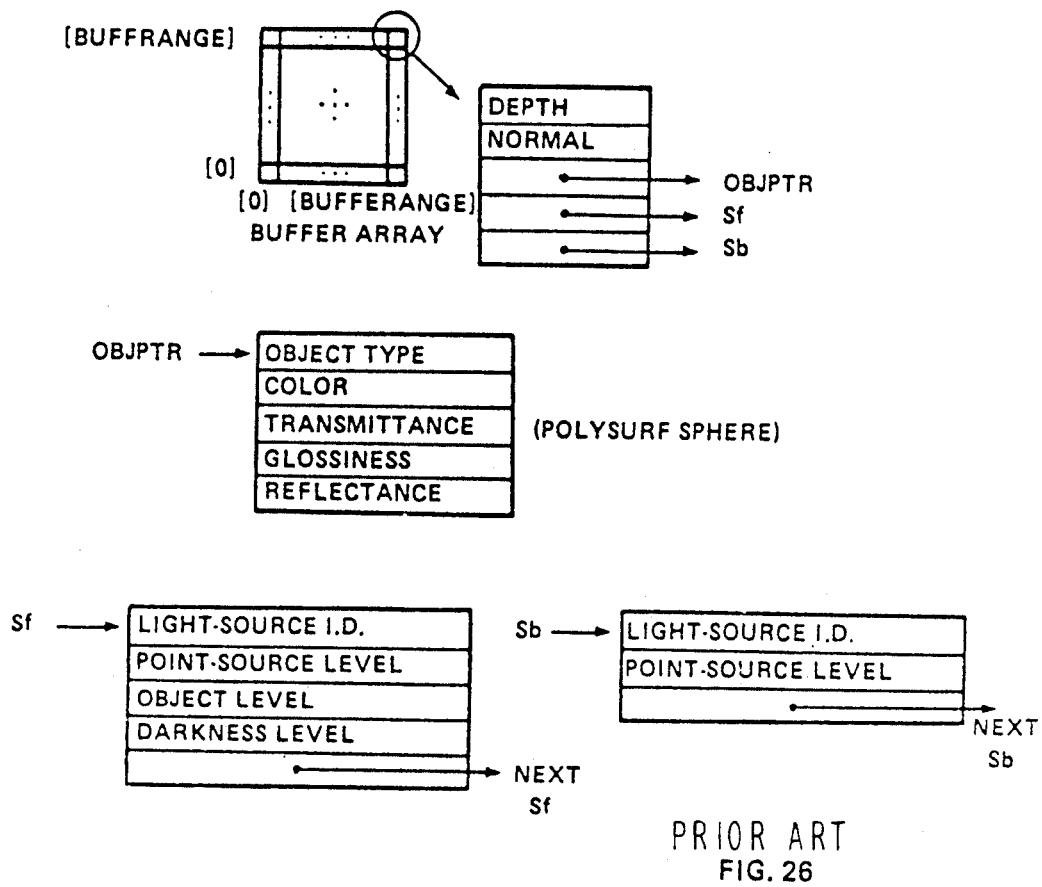
Figure 27:
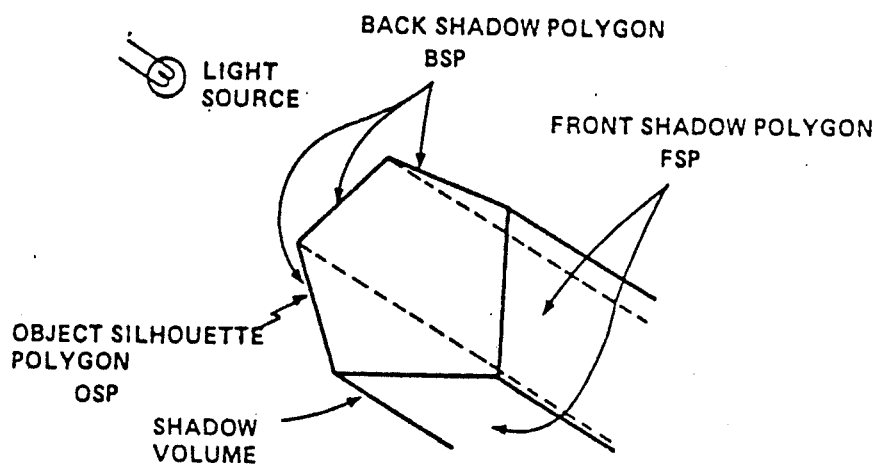

The sequence of processing of the span data using this technique for generating shadows from multiple point sources is the same as that of the above-mentioned technique for the light source of finite extent, and accordingly processes shadow volumes for each point source. However, because it is necessary to distinguish the point sources in this case, ELn (n being an integer from 0 to M−1, and an identification number of the point source), is used instead of the attribute value of EL indicating the span data at the end of each point source (see FIG. 21).

The span data being used has the following format including the classifying index to the normal vector of the polygon (NID):

(ATTR, XL, XR, ZL, dZ, IL, dI, NID)

Of course, it may be possible while expanding the span data to the pixel data to perform the expansion while interpolating the normal vector, and then to find the index for each pixel (this provides an image with higher quality, but increases the amount of calculation).

The terms relating to the normal vector and the brightness are not used in the shadow polygon (they have no meaning). The term relating to the brightness of the span data for the ordinary polygon uses the sum of contributions that do not take into consideration the shadows created by all point sources.

MULTIPLE LIGHT SOURCES OF FINITE EXTENT

The shadow finding method, the method for checking the shadow finding flag, and the technique for processing the shadow volume for each light source of this embodiment can be used as they are even for generation of an image including shadows for multiple light sources of finite extent.

DUMMY SPAN DATA

In the above embodiment, processing is executed for all pixels on a scan line. The above technique is the best suitable for hardware that is a pipeline (or systolic array) type, and accordingly has a processing mechanism corresponding to all pixels on the scan line. However, if the execution is performed in software, or if there is no processing mechanism corresponding to all pixels on the scan line, it is not efficient to check TSF for all pixels.

Figure 22:
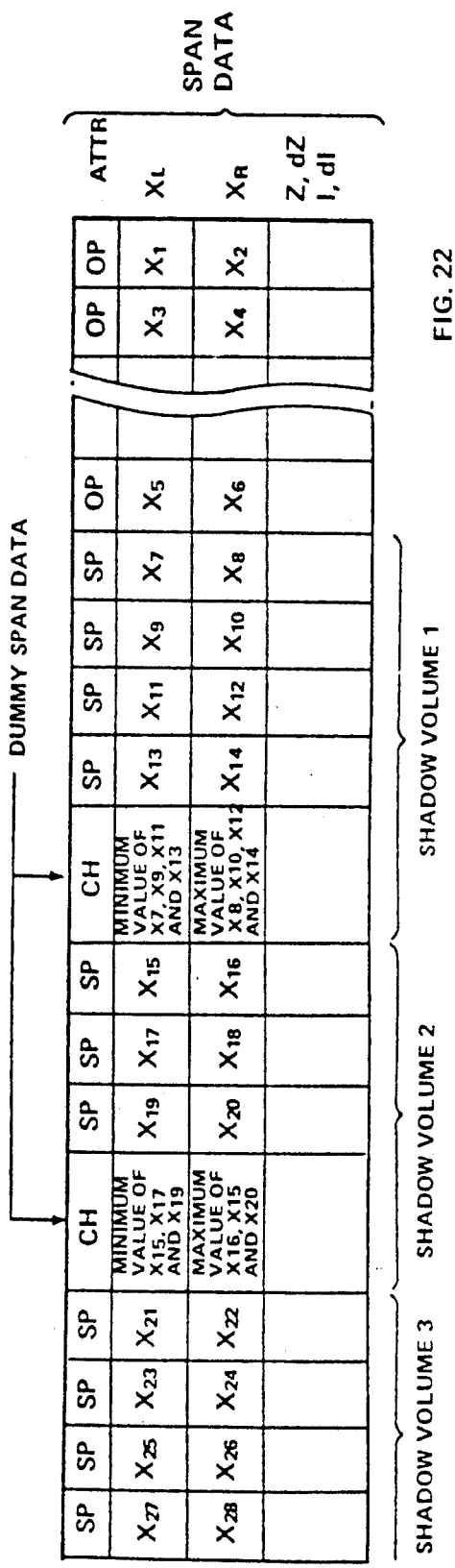
FIG. 22 is a diagram illustrating the dummy span data employed when using a non-pipeline type processor.

Thus, an alternate embodiment comprising a method for improving the efficiency in such a case is described. In this case, only pixels surrounded by XL and XR of the span data are processed. When, in this alternate embodiment, processing is performed using the span data string of FIG. 11, there may arise a possibility that, in checking shadows for each shadow volume, some pixels, even if they relate to the subject shadow volume, are not checked. Therefore, the attribute of EV is eliminated, and dummy span data for checking for each shadow volume is added to the last of the span data belonging to each shadow volume (see FIG. 22).

The dummy span data is identified by an attribute of CH, (the associated span data elements of depth value and brightness value are not significant and may be ignored.) The XL and XR of the dummy span data (with the attribute of CH) are the minimum value of XL and the maximum value of XR respectively, of span data of other shadow polygons of the shadow volume.

ADVANTAGE OF THE INVENTION

As described, this invention finds the parity of the number of intersections between shadow polygons, which define a shadow volume, and the line of sight, and determines whether or not there is a visible shadow on a pixel position based on the parity and the determination of whether or not the viewpoint is in the shadow volume. A concave object shape need not be segmented into convex objects as is conventionally done, which simplifies the processing. It becomes possible to simplify the arrangement because information on the shadow polygon, whether it is facing toward or away from the viewpoint is not needed. In addition, even in the case where a number of point light sources are handled, the arrangement is simplified by finding the number of shadows for each light source (reducing the number of types of counters), and can be further significantly simplified by using a quantized normal vector. The speed can be improved when using other than a pipeline processor arrangement by introducing dummy span data.

I claim:

1. A graphics system comprising:
   object display data generation means for generating pixel data, which is used to display object polygons defining an object on a screen of a display unit, and depth data relating to said pixel data;
   pixel data selection means for selecting pixel data with a smallest depth for each pixel position;
   means for generating shadow polygons, which define a shadow volume created by one of said object polygons intercepting light from a light source;
   parity determination means for determining, for each pixel position and each shadow volume, whether or not there are one or more shadow polygons between a depth position of a viewpoint and a depth position of pixel data for the selected pixel position, and for determining a parity of the number of shadow polygons existing between said positions;
   viewpoint position evaluation means for determining whether or not said viewpoint exists in the shadow volume relating to the parity determination;
   shadow determination means for determining, based on the resultant determination of said parity determination means and said viewpoint position evaluation means, that there is a shadow on said pixel position if said viewpoint is in the shadow volume relating to said parity determination, and said parity determination is even, or if said viewpoint is outside the shadow volume relating to said parity determination, and said parity determination is odd;
   pixel data modulation means for modulating the pixel data outputted from said pixel data selection means, based on the resultant determination of said shadow determination means, to reflect the shadow on said pixel data; and
   pixel data outputting means for outputting the modulated pixel data to said display unit.

2. A graphics system as claimed in claim 1 further comprising processing range limiting means for generating processing range limiting data indicating in which range of a scan line the pixel data selection means, parity determination means, viewpoint position evaluation means and shadow determination means processing is necessary for said shadow volume; and processing avoiding means for avoiding unnecessary processing based on said processing range limiting data.

3. A graphics system comprising:
   object display data generation means for generating pixel data, which is used to display object polygons defining an object on a screen of a display unit, and depth data relating to said pixel data;
   pixel data selection means for selecting pixel data with a smallest depth for each pixel position;
   means for generating shadow polygons, which define a shadow volume created by one of said object polygons intercepting light from a light source;
   parity determination means for determining, for each pixel position, and each shadow volume, whether or not there are one or more shadow polygons between a depth position of a viewpoint and a depth position of pixel data for the selected pixel position, and for determining a parity of the number of shadow polygons existing between said positions;
   viewpoint position evaluation means for determining whether or not said viewpoint exists in the shadow volume relating to the parity determination;
   shadow determination means for determining, based on the resultant determination of said parity determination means and said viewpoint position evaluation means, that there is a shadow on said pixel position if said viewpoint is in the shadow volume relating to said parity determination, and said parity determination is even, or if said viewpoint is outside the shadow volume relating to said parity determination, and said parity determination is odd;
   counting means responsive to the resultant determination by said shadow determination means for each of a plurality of light sources, for counting how many of said light sources generate shadows on each pixel position;
   pixel data modulation means for modulating the pixel data outputted from said pixel data selection means based on the resultant count of said counting means to reflect the shadows, including penumbrae, on said pixel data; and
   pixel data outputting means for outputting the modulated pixel data to said display unit.

4. A graphics system as claimed in claim 3 further comprising processing range limiting means for generating processing range limiting data indicating in which range of a scan line the pixel data selection means, parity determination means, viewpoint position evaluation means and shadow determination means processing is necessary for said shadow volume; and processing avoiding means for avoiding unnecessary processing based on said processing range limiting data.

5. A graphics system comprising:
   object display data generation means for generating pixel data, which is used to display object polygons defining an object on a screen of a display unit, and depth data relating to said pixel data;
   pixel data selection means for selecting pixel data with a smallest depth for each pixel position;
   means for generating shadow polygons, which define a shadow volume created by one of said object polygons intercepting light from a light source;
   parity determination means for determining, for each pixel position, and each shadow volume, whether or not there are one or more shadow polygons between a depth position of a viewpoint and a depth position of pixel data for the selected pixel position, and for determining a parity of the number of shadow polygons existing between said positions;
   viewpoint position evaluation means for determining whether or not said viewpoint exists in the shadow volume relating to the parity determination;
   shadow determination means for determining, based on the resultant determination of said parity determination means and said viewpoint position evaluation means, that there is a shadow on said pixel position if said viewpoint is in the shadow volume relating to said parity determination, and said parity determination is even, or if said viewpoint is outside the shadow volume relating to said parity determination, and said parity determination is odd;
   shadow light source data generation means for each of said pixel positions, responsive to the resultant determination by said shadow determination means for each of a plurality of light sources, for generating shadow light source data indicative of which of said light sources generates a shadow on the pixel position concerned;
   means for generating for each pixel position normal data of an object polygon to which the pixel data occupying said pixel position belongs;
   shadow intensity determination means for determining intensity of a shadow based on said shadow light source data and said normal data;
   pixel data modulation means for modulating the pixel data from said pixel data selection means based on the shadow intensity data from said shadow intensity determining means to reflect the shadows, including prenumbrae, on said pixel data; and
   pixel data outputting means for outputting the modulated pixel data to said display unit.

6. A graphics system as claimed in claim 5, wherein said normal data is quantized.

7. A graphics system as claimed in claim 6, wherein said object display data generation means, said pixel data selection means, and said parity determination means are composed of a pipeline type processing means.

8. A graphics system as claimed in claim 5 further comprising processing range limiting means for generating processing rate limiting data indicating in which range of a scan line the pixel data selection means, parity determination means, viewpoint position evaluation means and shadow determination means processing is necessary for said shadow volume; and processing avoiding means for avoiding unnecessary processing based on said processing range limiting data.

9. A method for drawing shadows in a computer graphics display system that has a display device organized as a plurality of display positions arranged in a grid, a processor for generating data representing objects to be displayed, and a depth buffer storing a depth of the object closest to a viewpoint, said method comprising:
   generating a display value for each display position by repeating the steps of:
      testing an object representation to determine whether or not an object exists at said display position;
      if the object exists, comparing a depth value for said object at said display point with a depth value recorded in said depth buffer;
      if said object depth value is less than said depth buffer value, replacing said depth buffer value with said object depth value, and generating a display value for said object;
   repeating the above three steps for each object to be generated;
      comparing at said display position a depth value for a shadow polygon comprising a portion of a shadow volume of one of said objects, with said depth buffer depth value;
      if said shadow polygon depth value is less than said depth buffer value, inverting a shadow parity indicator for said display position;
      if said shadow polygon is the last shadow polygon representing a shadow polygon volume, generate data representing a shadow intensity and a final shadow status flag based on said shadow parity indicator;
   repeating the above four steps for all shadow polygons;
   generating an object display value if said final shadow status flag is not set, or generating a shadow display value if said final shadow status flag is set.

10. The method of claim 9 wherein the step of generating a shadow display value comprises:
    dividing each shadow polygon into a plurality of subsections;
    determining a normal vector and an intensity for each of said subsections; and
    classifying each display position by subsection;
    generating a shadow display value for said display position using said normal vector and intensity of said classified subsection.

* * * * *